US009417992B2

(12) United States Patent  (10) Patent No.: US 9,417,992 B2
Huang et al.  (45) Date of Patent: Aug. 16, 2016

(54) WEB PORTAL API TEST REPORT GENERATION

(71) Applicant: Oracle International Corporation, Redwood Shores, CA (US)

(72) Inventors: ShinJie Huang, Belmont, CA (US); Bhupendra Mohanlal Patel, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/864,025

(22) Filed: Sep. 24, 2015

(65) Prior Publication Data

US 2016/0085662 A1 Mar. 24, 2016

Related U.S. Application Data

(60) Provisional application No. 62/054,593, filed on Sep. 24, 2014.

(51) Int. Cl.
*G06F 9/44* (2006.01)
*G06F 11/36* (2006.01)

(52) U.S. Cl.
CPC ........ *G06F 11/3668* (2013.01); *G06F 11/3604* (2013.01)

(58) Field of Classification Search
CPC ............ G06F 11/3684; G06F 11/3672; G06F 11/3688; G06F 11/3664; G06F 11/3668; G06F 11/3604
See application file for complete search history.

(56) References Cited

U.S. PATENT DOCUMENTS

| 7,016,800 B1* | 3/2006 | Nguyen ............... G06F 11/3696 702/108 |
| 7,506,311 B2* | 3/2009 | Subramanian ...... G06F 11/3664 714/25 |
| 8,091,072 B2 | 1/2012 | Shah et al. |
| 8,321,839 B2* | 11/2012 | Slone .................. G06F 11/3684 717/124 |
| 8,443,381 B2* | 5/2013 | Nagahara ............ G06F 11/3668 719/320 |
| 8,862,950 B1* | 10/2014 | Ginsberg ............ G06F 11/3688 714/25 |
| 9,021,443 B1* | 4/2015 | Lachwani ........... G06F 11/3664 717/124 |
| 2003/0182457 A1* | 9/2003 | Brewin ..................... G06F 8/51 719/310 |
| 2006/0101397 A1 | 5/2006 | Mercer et al. |
| 2006/0236327 A1* | 10/2006 | Lu ....................... G06F 11/3664 719/328 |
| 2007/0168973 A1 | 7/2007 | Crihfield |
| 2011/0078790 A1* | 3/2011 | Fazunenko .............. G06F 9/468 726/22 |
| 2014/0040864 A1* | 2/2014 | Li ....................... G06F 9/44521 717/126 |

OTHER PUBLICATIONS

S. Mishra, APIs now easy with JUNIT, Mar. 2013, 22 pages.*
Dawson et al., Testing class libraries for RTSJ safety, Sep. 2008, 7 pages.*
Kim et al., REMI: defect prediction for efficient API testing, Aug. 2015, 4 pages.*
C. McManis; "Java Indepth How-To Take an In-Depth Look at the Java Reflection API"; Javaworld; Sep. 1, 1997.

* cited by examiner

*Primary Examiner* — Thuy Dao
(74) *Attorney, Agent, or Firm* — Miles & Stockbridge P.C.

(57) ABSTRACT

A system for generating application programming interface ("API") test reports for a software application derives one or more Java APIs to be tested from the software application and derives Java Unit ("JUnit") test methods used to test the Java APIs. The system then maps each Java API with a corresponding JUnit test method and generates one or more test reports.

18 Claims, 12 Drawing Sheets

Fig. 5

| Views: | MAIN_API_TEST_Report_1 ▼ | | | | | 800 |
|---|---|---|---|---|---|---|
| S | W | Name ↓ | Last Success | Last Failure | Last Duration | Built On |
| ● | | activity-stream-service-model<br>API_local_view_WORKPLACE_MAIN | 13 hr -<br>#905 | N/A | 26 min | jenkins_slc00vaz |
| ● | | activity-stream-service-view<br>API_local_view_WORKPLACE_MAIN | 13 hr -<br>#1000 | N/A | 22 min | jenkins_slc00aii |
| ● | | announcement-service-model<br>API_local_view_WORKPLACE_MAIN | 13 hr -<br>#984 | N/A | 19 min | jenkins_slc04lue |
| ● | | doclib-service-model<br>API_local_view_WORKPLACE_MAIN | 13 hr -<br>#1025 | N/A | 57 min | jenkins_slc03kt |
| ● | | doclib-service-view | 14 hr -<br>#894 | N/A | 33 min | jenkins_slc00sfi |
| ● | | event-abstract<br>API_local_view_WORKPLACE_MAIN | 13 hr -<br>#897 | N/A | 25 min | jenkins_slc00xdt |
| ● | | event-service-model<br>API_local_view_WORKPLACE_MAIN | 14 hr -<br>#901 | N/A | 29 min | jenkins_slc00ea |
| ● | | generalsettings-service-model<br>API_local_view_WORKPLACE_MAIN | 13 hr -<br>#898 | 13 hr -<br>#887 | 17 min | jenkins_slc04lue |
| ● | | generic-site-resources-model<br>API_local_view_WORKPLACE_MAIN | 2 mo 2 days<br>- #759 | 33 min -<br>#1036 | 18 min | jenkins_slc03kt |
| ● | | lifecycle-service-model<br>API_local_view_WORKPLACE_MAIN | 14 hr -<br>#901 | N/A | 24 min | jenkins_slc04slt |
| ● | | list-service-model<br>API_local_view_WORKPLACE_MAIN | 5 hr 34 min -<br>#1035 | 14 hr -<br>#891 | 25 min | jenkins_slc04ne |
| ● | | list-service-view<br>API_local_view_WORKPLACE_MAIN | 12 hr -<br>#964 | N/A | 21 min | jenkins_slc00xdt |
| ● | | note-service-model<br>API_local_view_WORKPLACE_MAIN | 3 mo 7 days<br>- #641 | N/A | 30 min | jenkins_slc00vei |
| ● | | notification-service-model<br>API_local_view_WORKPLACE_MAIN | 13 hr -<br>#970 | N/A | 22 min | jenkins_slc00vei |
| ● | | page-service-model<br>API_local_view_WORKPLACE_MAIN | 13 hr -<br>#879 | N/A | 23 min | jenkins_slc00xi |

Fig. 8

WEB PORTAL API TEST REPORT GENERATION

CROSS REFERENCE TO RELATED APPLICATIONS

This application claims priority of Provisional Patent Application Ser. No. 62/054,593, filed on Sep. 24, 2014, the contents of which is hereby incorporated by reference.

FIELD

One embodiment is directed generally to a computer system, and in particular to a computer system that generates a web portal.

BACKGROUND INFORMATION

An Application Programming Interface ("API") is a collection of software functions and procedures, referred to as "API calls", that can be executed by other software applications. Application developers can include links to existing APIs in an application to make use of their functionality. This link is generally seamless and end users of the application are typically not aware that a separately developed API is being invoked.

During API testing, a test harness application may be used that links to the APIs and methodically exercises their functionality in order to simulate the use of the API by end user applications. API testing applications need to ensure that the test harness varies parameters of the API calls in ways that verify functionality and expose failures. This includes assigning common parameter values as well as exploring boundary conditions. API testing further needs to generate interesting parameter value combinations for calls with two or more parameters, and determine the content under which an API call is made. Further, API testing typically needs to include sequencing API calls to vary the order in which the functionality is exercised and to make the API produce useful results from successive calls.

SUMMARY

One embodiment is a system for generating application programming interface ("API") test reports for a software application. The system derives one or more Java APIs to be tested from the software application and derives Java Unit ("JUnit") test methods used to test the Java APIs. The system then maps each Java API with a corresponding JUnit test method and generates one or more test reports.

BRIEF DESCRIPTION OF THE DRAWINGS

FIGS. 5-9 illustrate some example API test reports generated by embodiments of the present invention.

DETAILED DESCRIPTION

One embodiment, as part of automated API testing for a web portal, generates and provides reports and identifies untested APIs as part of a continuous testing framework. Embodiments implement byte code introspection of the test code to map the API to tests. Embodiments can be plugged into any continuous testing framework to generate the reports.

Portal web sites, or "web portals", are increasingly being used to deliver complex and diverse content over a computer network. A web portal is a web site containing one or more portlets displayed on a web page. A portlet is a configurable content area displayable on a web page that provides content or performs one or more associated functions, or both. Portlets may display content that is obtained from a source remote from the web server. For example, a portal web site may use an arrangement of portlets to display web content on different subject areas. The web content for each of the subject areas need not be stored centrally to the web server, but instead may be stored in a plurality of locations geographically removed, but accessible to the portal web server. A portlet may be configured such that it may display the information it obtains to the web browser in a customized manner. A web portal includes multiple APIs to external data sources and applications that need to be thoroughly tested in an automated manner.

From an end user perspective, a portal is a web site with pages that are organized by tabs or some other form(s) of navigation. Each page can contain a nesting of sub-pages that are related hierarchically. Any page can contain multiple portlets, task flows, or other elements, giving users access to different information and tools in a single place. An administrator can modify a portal at runtime by, for example, adding new pages or changing the look and feel. If authorized through delegated administration, individual users can modify their view of a portal as well.

Figure 1:
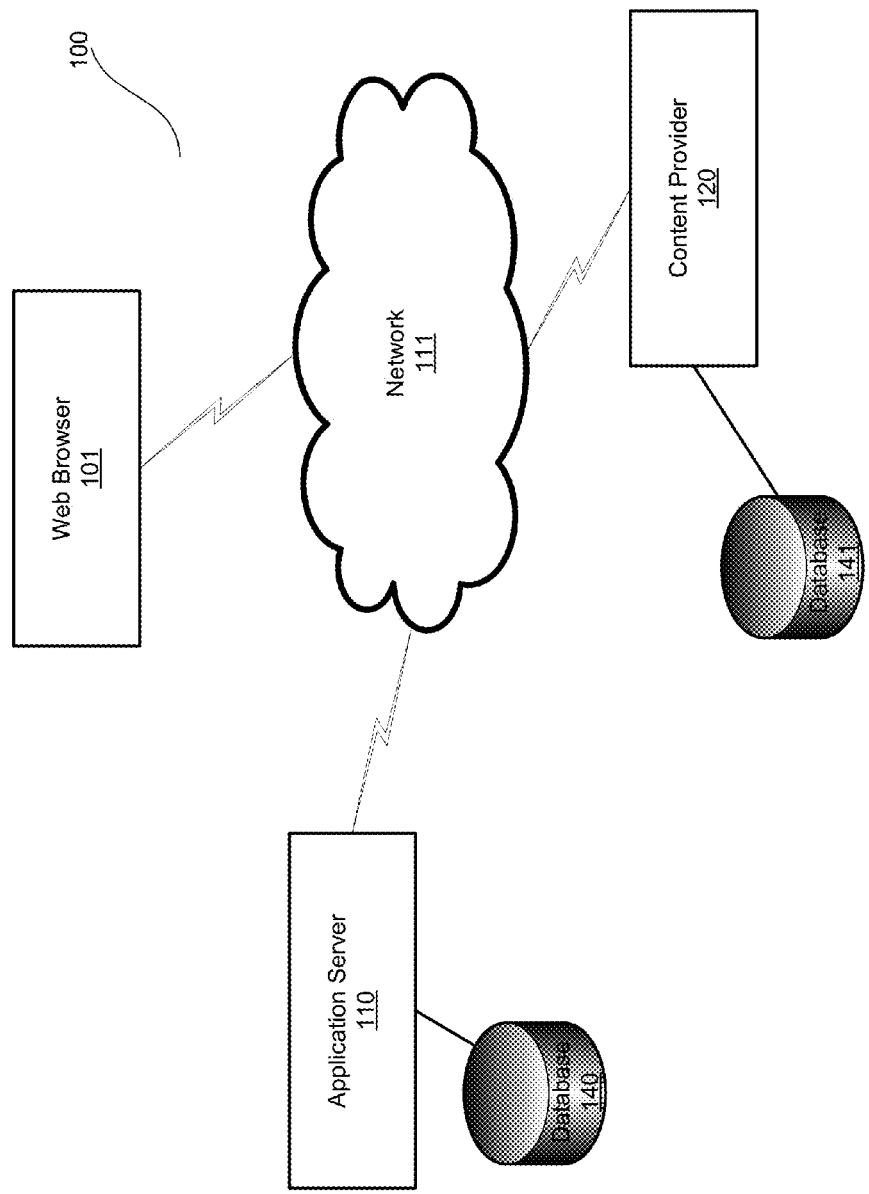
FIG. 1 is an overview diagram of a portal system including network elements that implement embodiments of the present invention and/or interact with embodiments of the present invention.

FIG. 1 is an overview diagram of a portal system 100 including network elements that implement embodiments of the present invention and/or interact with embodiments of the present invention. Portal system 100 includes a web browser 101, an application/web server 110, databases 140, 141, and a content provider 120.

A web browser 101 is any device capable of browsing content over a computer network 111, such as the Internet, and is operatively connected to application server 110. While only one web browser 101 is shown in FIG. 1, multiple web browsers 101 may be operatively connected to application server 110. Web browser 101 and application server 110 may communicate over computer network 111 using well-known communication protocols, such as Transmission Control Protocol ("TCP") and Internet Protocol ("IP"), or TCP/IP, HTTP and Extensible Markup Language ("XML").

In one embodiment, application server 110 is a well-known component that assembles and serves web pages to one or more web browsers 101. Application server 110 in one embodiment functions as an underneath middleware framework, and further includes applications such as Java 2 Platform, Enterprise Edition ("J2EE") applications. As such, application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user.

A content provider 120 is a functional component that provides content for a portlet in response to requests from application server 110. Content provider 120 in one embodiment is software operating on a separate hardware device other than that executing application server 110. In other embodiments, the functionality of content provider 120 and application server 110 can be implemented on the same network element. In some embodiments, content provider 120 may be implemented using a cross-platform component architecture such as the JavaBean architecture. Such an embodiment is advantageous when deploying content providers 120 over multiple platforms.

Application server 110 assembles the requested web page using any content received from content provider 120 and data stored in an associated central repository concerning the organization and presentation of the web page. In one embodiment, the data stored in the central repository that application server 110 uses in assembling the requested web page includes data concerning the following attributes of the web page: style, layout, content resident thereon, portlets displayed thereon, items displayed thereon, groups, folders and user permissions for the web page. In other words, application server 110 manages data concerning the appearance and operation of portal web sites in a central repository, such as a database, and uses that information to assemble the web page, along with content received from content providers 120. The data application server 110 uses in rendering web pages may be directed towards visual aspects of the page (e.g., style or layout information), or it may be directed towards operational aspects of the page (e.g., what portlets are displayed, permissions regarding access to portions of the web page, etc.).

In embodiments of the invention, web pages are dynamically generated based upon data stored in tables in a database. In some embodiments, the content of the web page are stored in tables in a database, including databases 140, 141.

Figure 2:
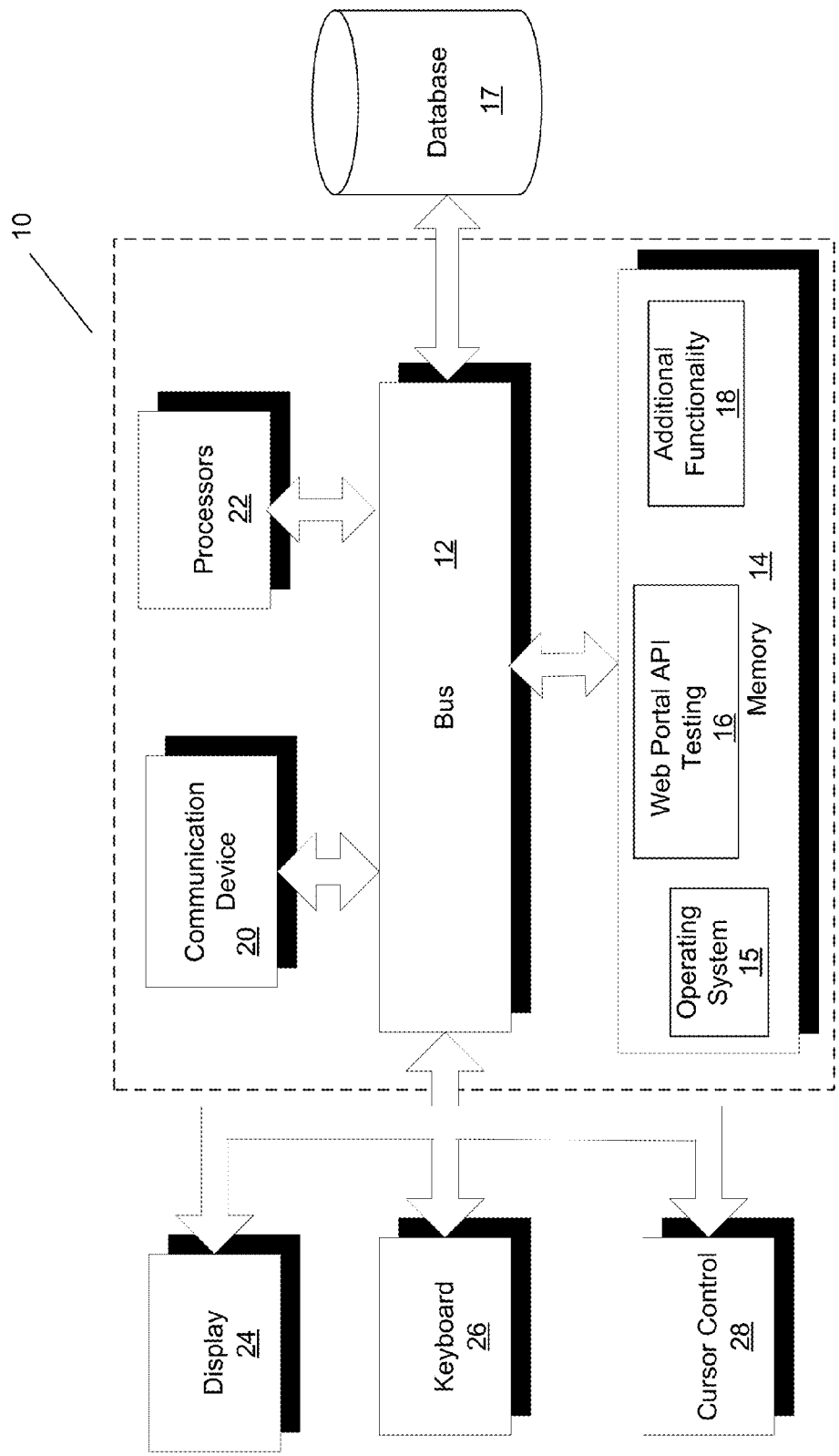
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of application server 110, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a web portal API testing module 16 for testing a web portal API and generating test reports, and all other functionality disclosed herein. System 10 can be part of a larger system, such as added functionality to "WebCenter Portal" from Oracle Corp. Therefore, system 10 can include one or more additional functional modules 18 to include the additional functionality. A database 17 is coupled to bus 12 to provide centralized storage for modules 16 and 18.

Figure 3:
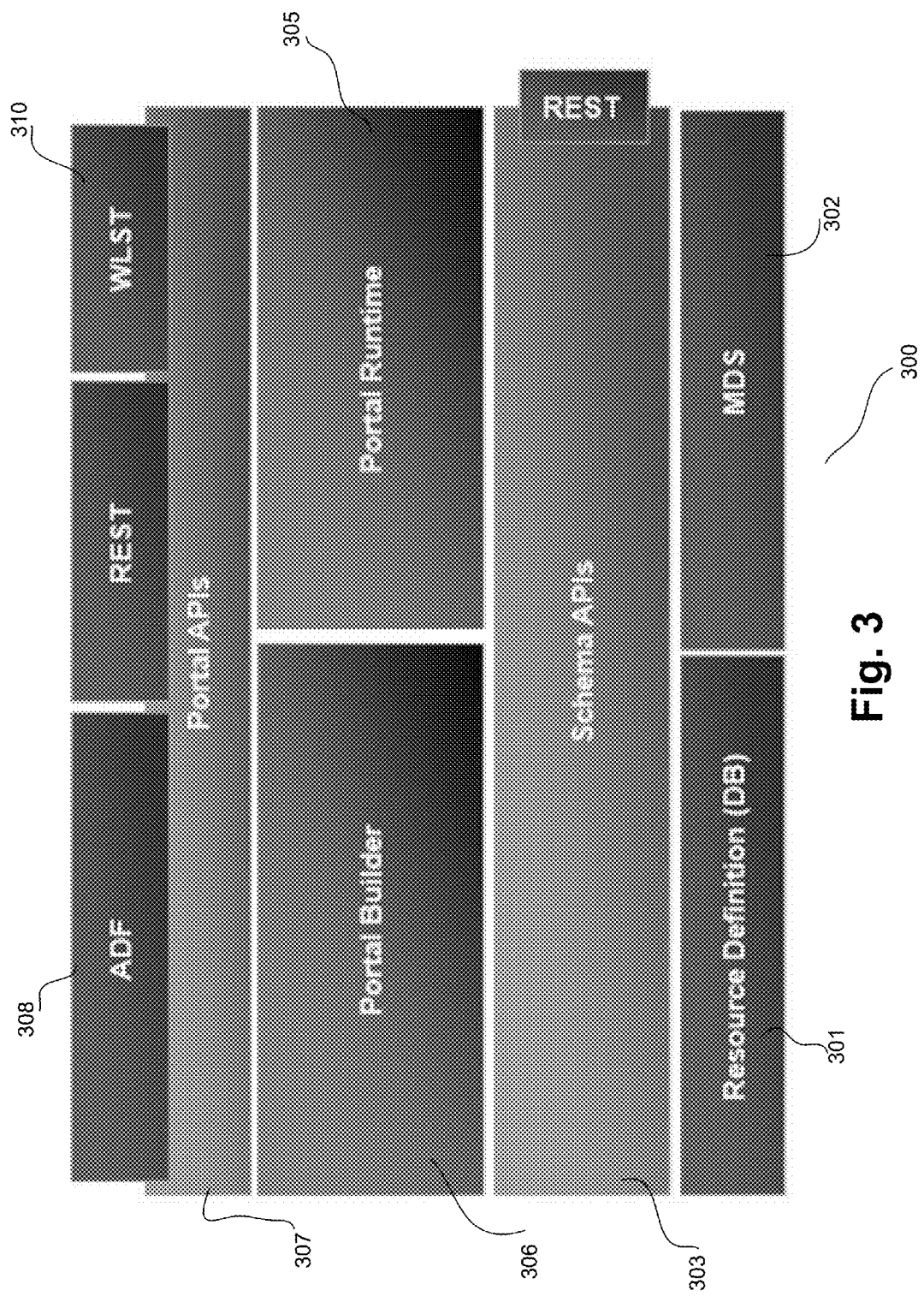
FIG. 3 is a block diagram illustrating the architecture of a web portal that includes APIs that are tested in accordance with embodiments of the present invention.

FIG. 3 is a block diagram illustrating the architecture of a web portal 300 that includes APIs that are tested in accordance with embodiments of the present invention. The components of portal 300 includes a resource definition database 301 and a Metadata Services ("MDS") database 302. MDS 302 supports personalization of the portal and stores user and runtime settings, and in one embodiment keeps metadata in the areas of a file-based repository, dictionary tables accessed by build-in functions and a metadata registry. Portal 300 further includes a portal builder 306 and portal runtime 305 which assist in generating and running the portal.

Portal 300 further includes a set of web-based REpresentational State Transfer REST ("REST") APIs for retrieving and modifying server data dynamically from the client. Shown in FIG. 3 are Schema APIs 303 and Portal APIs 307. Portal APIs 307 include an Application Development Framework ("ADF") 308 interface and a WebLogic Scripting Tool ("WLST") interface 310. All of the components shown in FIG. 3 are Java based components.

In one embodiment, the APIs that are tested are Java based APIs. When it comes to testing a product API code line, known methods would typically include writing Java Unit ("JUnit") test cases for testing specific API functions. A JUnit is a regression testing framework used by developers to implement unit testing in Java and accelerate programming speed and increase the quality of code. Known methods would then execute each of the API JUnit tests, and create a report for each API JUnit test to show a summary of the test results.

However, the known methods of testing APIs have multiple drawbacks. For one, regarding API method naming convention, if an API does not have a proper name it is neglected unless a user performs a detailed code review. Further, there is no clear indication about the API method information, and no "percentage" coverage regarding the APIs (e.g., where this is tested, how many invocations has been done, etc.). Further, there is no overall report statistics regarding the API usage in the module (i.e., the group of classes that are responsible for a feature of the software application).

In contrast, embodiments perform API testing in which the reports include API test counts as metrics for measuring the quality of the product being tested. Since customers and/or other modules may use the tested APIs directly, having metrics indicating what percentage of APIs got tested can be very useful information in evaluating the overall quality of the product. Further, there is a need to be able to view all the APIs listed in one place, with corresponding test cases next to each. Therefore, embodiments provide an automatic way of checking on the API calls, referencing points, and providing overall statistics as a report.

Figure 4:
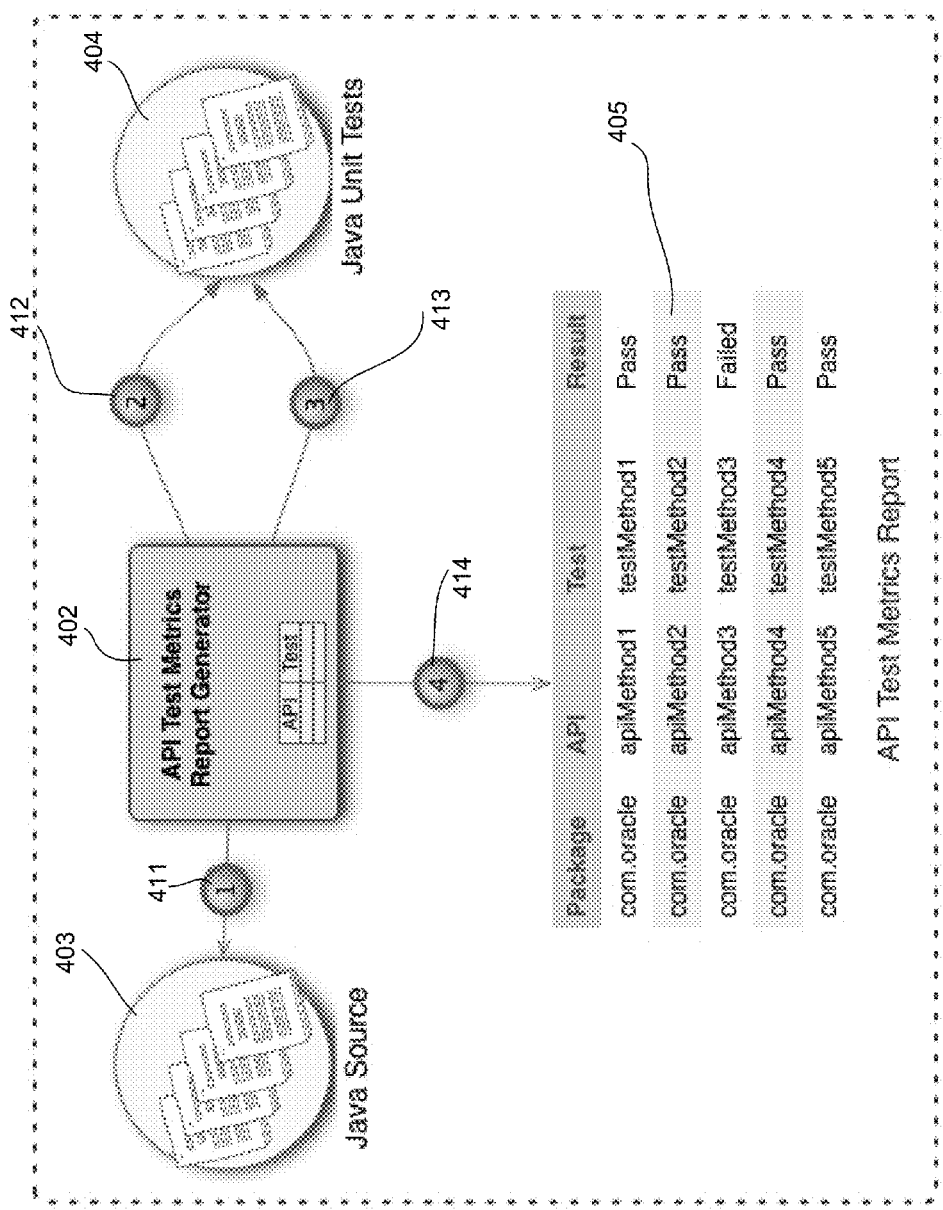
FIG. 4 is a block diagram of a Java API Test Metrics Report Generator in accordance with one embodiment.

FIG. 4 is a block diagram of a Java API Test Metrics Report Generator 402 in accordance with one embodiment. In one embodiment, Report Generator 402 is implemented by Web Portal API Testing module 16 of FIG. 2. API Test Metrics Report Generator 402 is based on byte code introspection that can be used as a plug-in to generate API test reports. The byte code introspection maps the API to JUnit tests, and does not require developers to add an annotation tag to each Java API because the annotations are derived from the JUnit tests.

As shown in FIG. 4, at 411, Report Generator 402 derives all the API Java interfaces for the web portal at a Java Source 403 to be tested using "Java Reflection." In one embodiment, the APIs derived at 411 would include APIs 303 and 307 of FIG. 3. Java Reflection makes it possible to inspect classes, interfaces, fields and methods at runtime, without knowing the names of the classes, methods, etc. at compile time. It is also possible to instantiate new objects, invoke methods and get/set field values using reflection At 412, using Java Reflection, Report Generator 402 derives all of the Java Unit Tests methods 404 that have an "@Test" annotation, or an equivalent annotation. The annotation in one embodiment is derived from a JUnit test case. A JUnit test program has the annotation to identify APIs to test.

At 413, using Java Reflection, Report Generator 402 adds more Junit test methods based on a custom @TestAnnotation.

At 414, using the custom list, Report Generator 402 makes custom changes to include/exclude APIs from the derived API Junit methods. A custom list is a list of API which is desired to specifically include/exclude in the API test report for any reason. For example, certain methods are not included by the traditional JUnit test framework but a user may still want it tested by embodiments of the invention.

Using byte code introspection, Report Generator 402 than maps each API (Java interface) with the corresponding JUnit test methods. Finally, using test integration with "Jenkins", or an equivalent integration tool, the overall API method and test mapping results can be shown on Jenkins report 405 on a daily basis, or any other selectable timeframe. "Jenkins" is an open source continuous integration tool written in Java. Jenkins provides continuous integration services for software development. It is a server-based system running in a servlet container such as Apache Tomcat. The report is generated by running the API test program as a standalone Java program.

Reports generated by embodiments of the invention can include daily reports showing the percentage of the web portal Java and REST APIs that have corresponding tests, and identify untested APIs as part of a continuous testing framework. Embodiments can be plugged into any continuous testing framework to generate the daily reports. Both Java interfaces and declared Java classes that have no corresponding interface can be monitored. To achieve this, byte code introspection of the test code is introduced to map the API to tests. In this approach, there is no need for developers to add an annotation tag to each Java API. Instead, byte code introspection is used to generate the reports and compare the list of APIs with those all tests registered using the standard JUnit testing framework.

FIGS. 5-9 illustrate some example API test reports generated by embodiments of the present invention.

Figure 5:
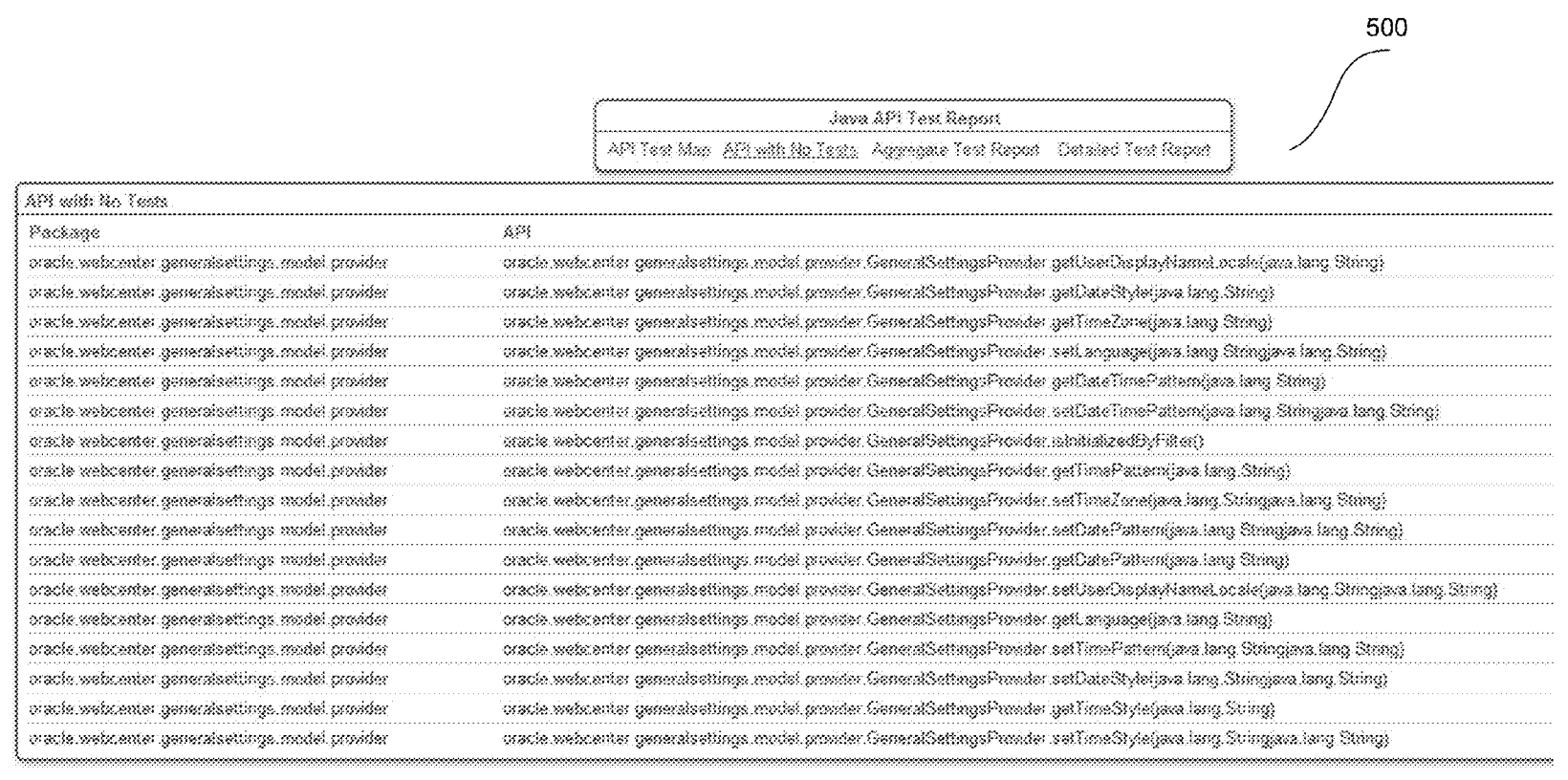

FIG. 5 illustrates an API test report 500 that lists APIs of a web portal that does not have any available corresponding API tests available in accordance with one embodiment. As long as an API exists, there should be a corresponding test. Therefore, FIG. 5 identifies these potential flaws in the testing.

Figure 6:
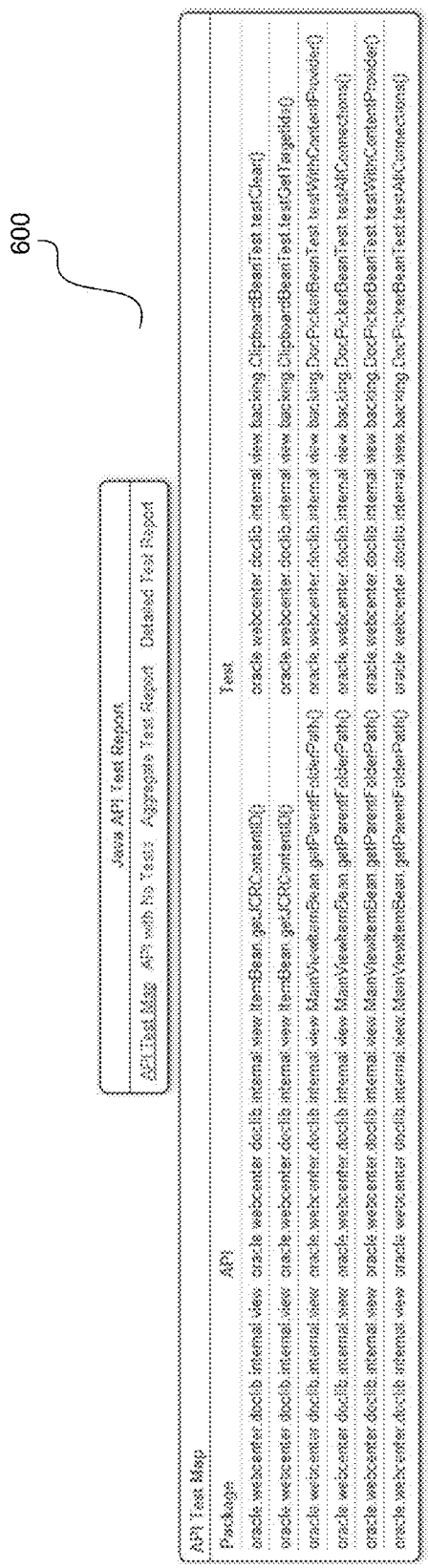

FIG. 6 illustrates an API test report 600 that shows how each API is being tested, and its test methods in accordance with one embodiment. Report 600 allows a user to determine if an API is being properly tested by mapping it to a test. Applications may include "methods" that are without corresponding tests, but those are not APIs. However, since each component to be tested has its own definition of APIs, the "methods" can be labeled as APIs so they can be tested.

Figure 7:
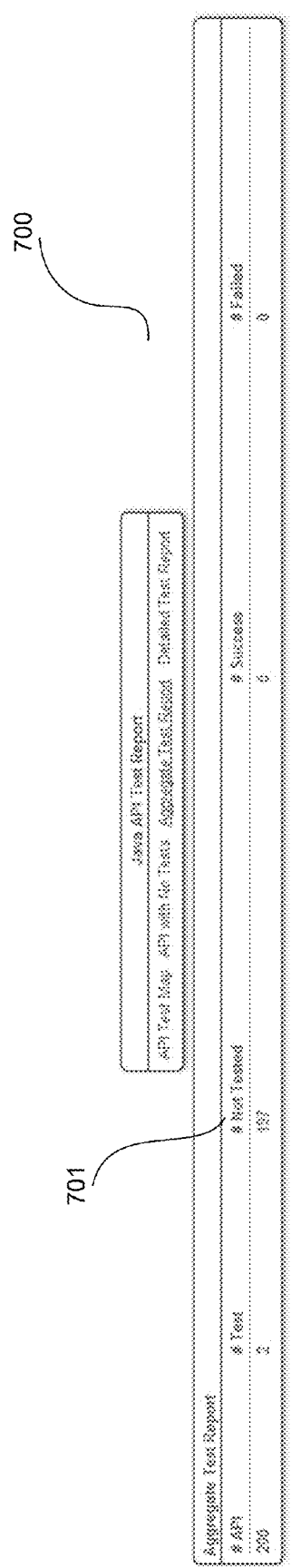

FIG. 7 illustrates an API test report 700 that shows the overall test report statistics based on certain modules in accordance with one embodiment. The "not tested" at 701 may be flagged or highlighted as it should be addressed by the module owner. Each module is identified as a specific group of software that is responsible for a certain aspect of the software (e.g., a "mail" module is responsible for sending out emails within an enterprise software application that has hundreds of other features).

FIG. 8 illustrates an API test report 800 listing an overall list of modules that is being executed on a Jenkins server in accordance with one embodiment. Different colors or other methods are used to indicated modules with all test passed, partially passed, and all failed.

Figure 9:
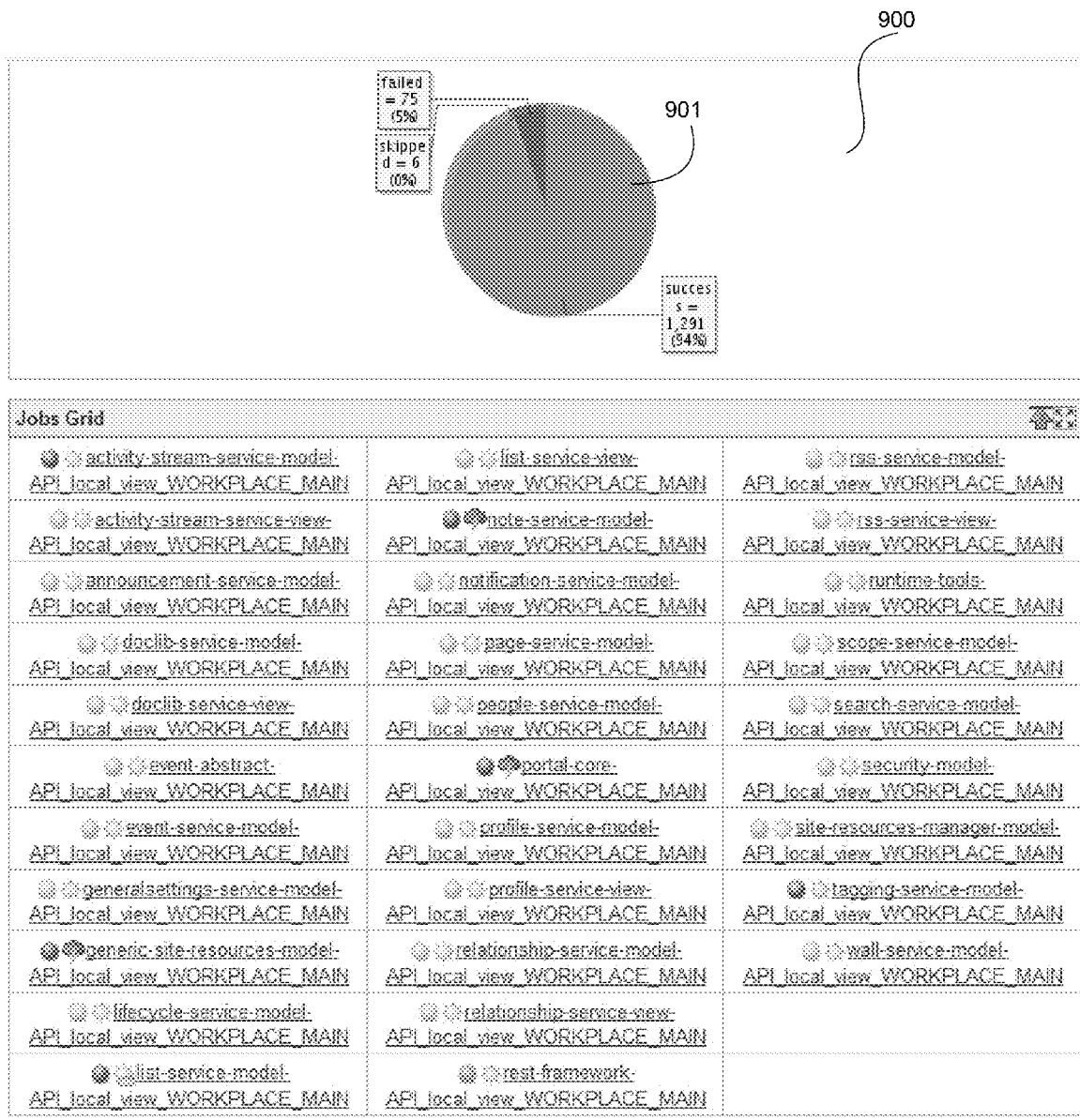

FIG. 9 illustrates an API test report 900 listing another view of showing the overall test result on the Jenkins server in accordance with one embodiment. In report 900, all modules listed in the columns and on a pie chart 901 is displayed with percentage information.

Figure 10:
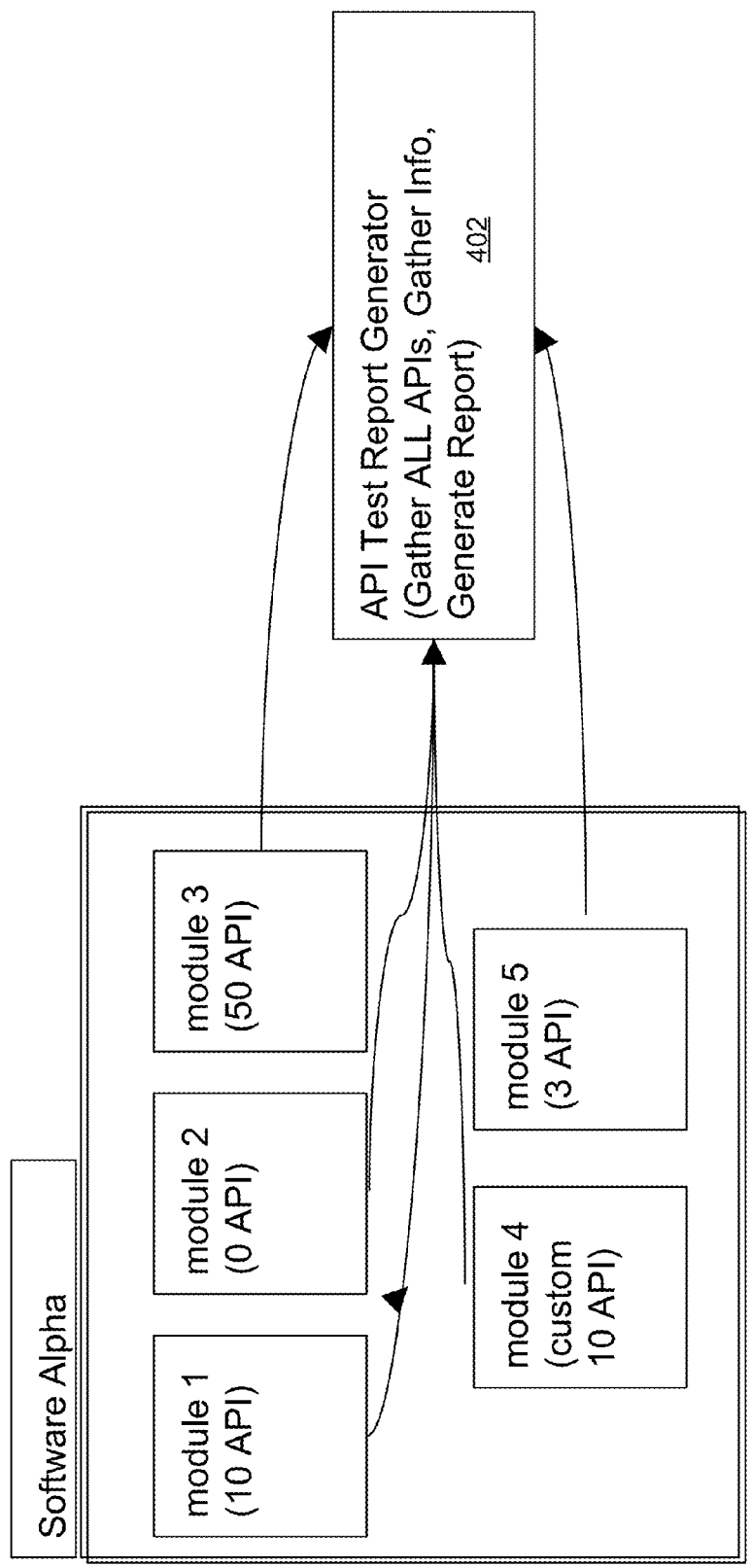
FIG. 10 is a block diagram illustrating API testing in accordance to one embodiment.

FIG. 10 is a block diagram illustrating API testing in accordance to one embodiment. As shown in FIG. 10, a software application "Alpha" includes five modules (modules 1-5). Each module may include Java APIs. Report generator 402 gathers all of the APIs, gathers information on the APIs and generates one or more reports.

Figure 11:
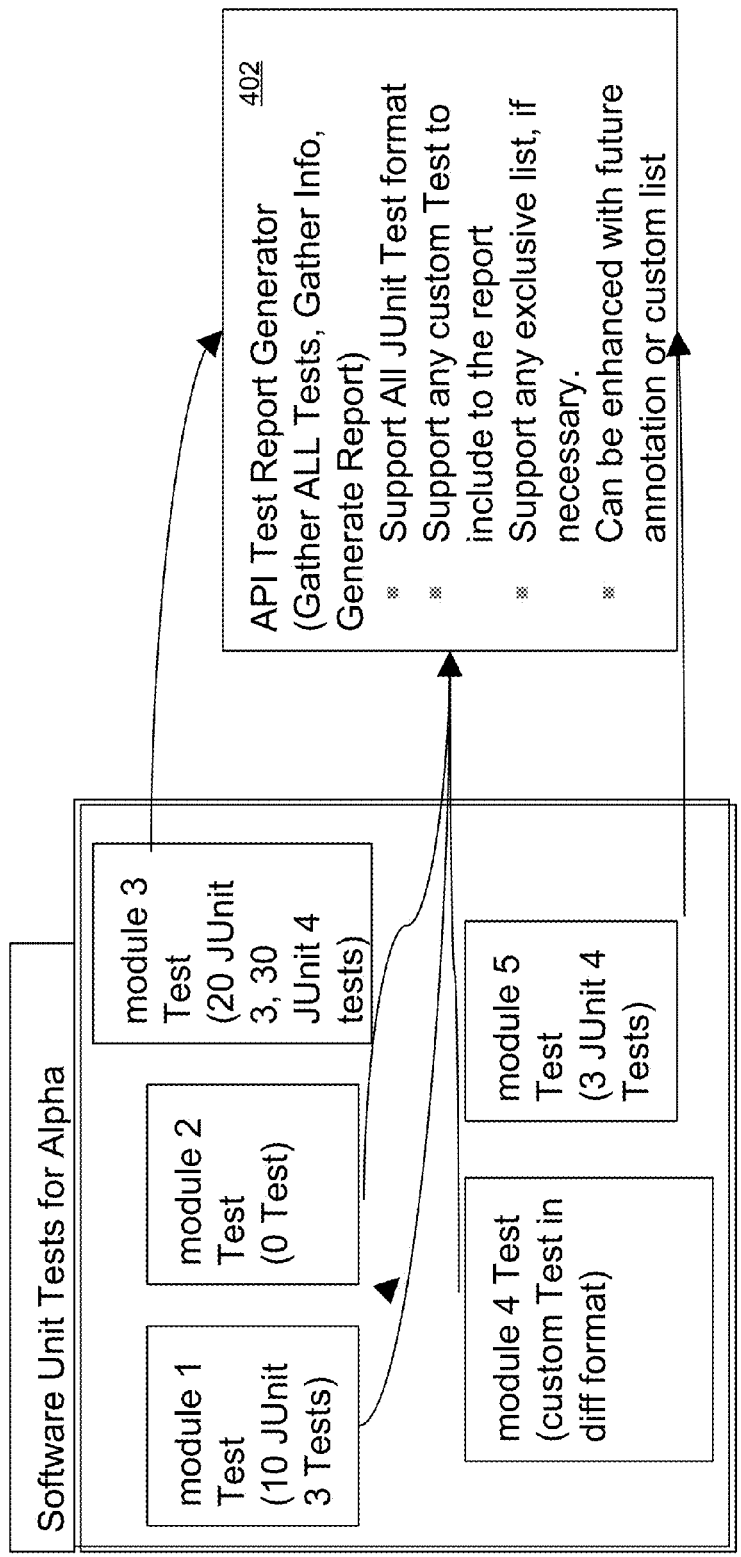
FIG. 11 is a block diagram illustrating API testing in accordance to one embodiment.

FIG. 11 is a block diagram illustrating API testing in accordance to one embodiment. In FIG. 11, the report generator 402 maps each Java API to a corresponding JUnit test. Specifically, for module 1, since it includes 10 APIs, 10 JUnit 3 tests are performed. For module 2, since it includes no APIs, no tests are mapped. For module 3, since it includes 50 APIs, 20 JUnit 3 tests are performed, and 30 JUnit 4 tests are performed. For module 4, a custom test in a different format is performed since it includes 10 custom APIs. For module 5, since it includes 3 APIs, 3 JUnit 4 tests are performed.

Figure 12:
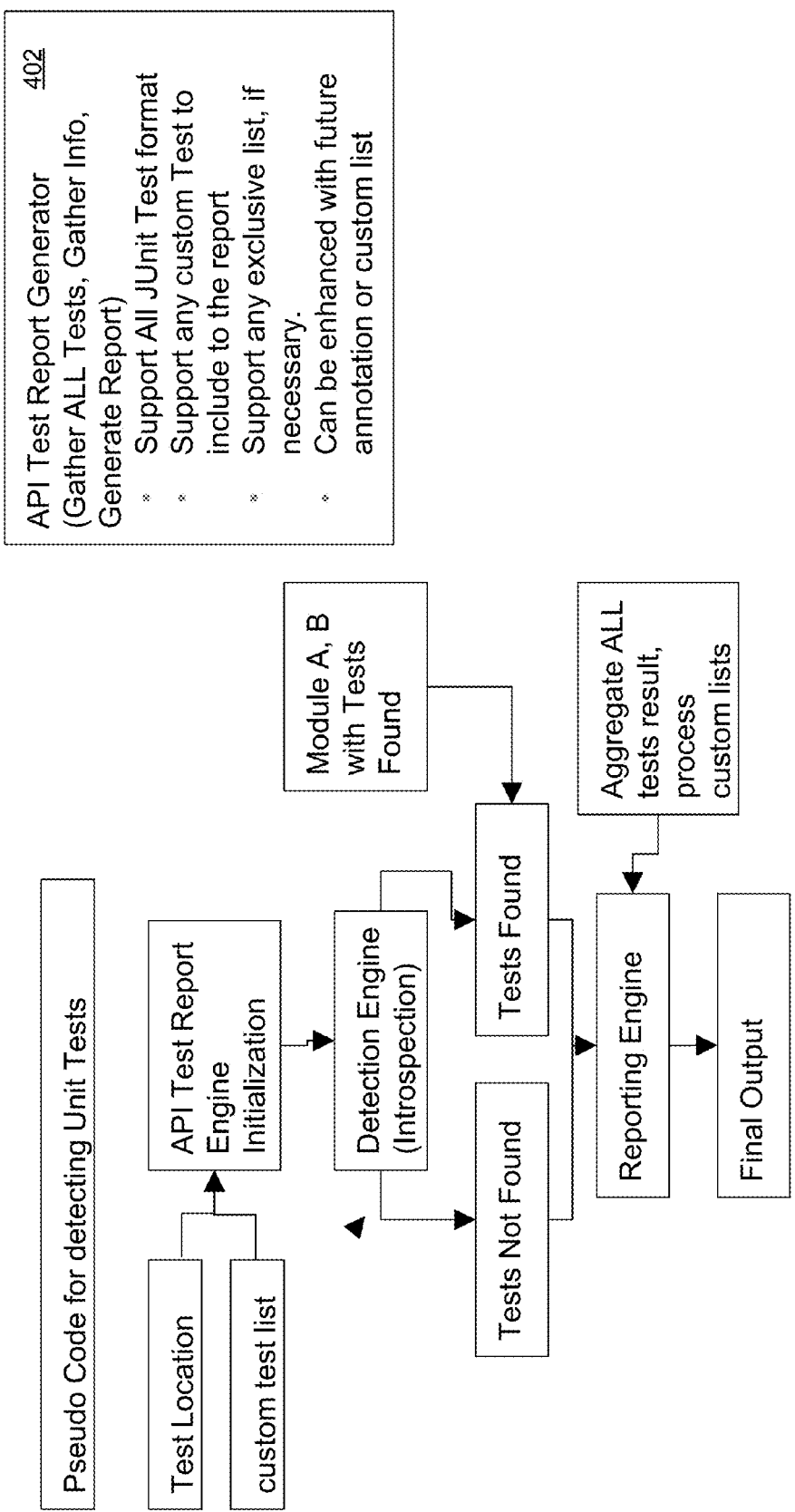
FIG. 12 illustrates pseudo code for detecting JUnit tests to be mapped to each API.

FIG. 12 illustrates pseudo code for detecting JUnit tests to be mapped to each API. A detection engine implements byte code introspection of the test code to map the API to tests.

As disclosed, embodiments integrate both JUnit test and Java Reflection to test Java APIs and generate test reports for software applications and Java API/features of software applications. Embodiments, based on Java Reflection can detect how many APIs are defined in the feature, at the same time can detect if these APIs are being tested in JUnit, and integrate them together to generate reports. The reports can showed the number of Java APIs that are defined and how many of them missed the test. This will allow a user to determine if the feature is fully tested. If there are APIs not being tested, the testing will need to be modified. Therefore, embodiments provide a test automation framework to detect APIs and the matching tests, and auto-generate reports.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-executed method of generating application programming interface (API) test reports for a software application, the method comprising:
    deriving one or more Java APIs to be tested from the software application;
    deriving Java Unit (JUnit) test methods used to test the Java APIs;
    mapping each Java API with a corresponding JUnit test method by using byte code introspection; and
    generating one or more test reports.

2. The method of claim 1, wherein the deriving one or more Java APIs to be tested comprises using Java Reflection.

3. The method of claim 1, wherein the deriving JUnit tests comprises searching for annotations.

4. The method of claim 3, wherein the annotations are derived from a JUnit test case.

5. The method of claim 1, wherein the one or more test reports comprise a percentage of Java APIs that were tested.

6. The method of claim 1, wherein the one or more test reports comprise a listing of Java APIs that do not have a corresponding JUnit test.

7. A non-transitory computer-readable medium having instructions stored thereon that, when executed by a processor, cause the processor to generating application programming interface (API) test reports for a software application, the generating comprising:
    deriving one or more Java APIs to be tested from the software application;
    deriving Java Unit (JUnit) test methods used to test the Java APIs;
    mapping each Java API with a corresponding JUnit test method by using byte code introspection; and
    generating one or more test reports.

8. The computer-readable medium of claim 7, wherein the deriving one or more Java APIs to be tested comprises using Java Reflection.

9. The computer-readable medium of claim 7, wherein the deriving JUnit tests comprises searching for annotations.

10. The computer-readable medium of claim 9, wherein the annotations are derived from a JUnit test case.

11. The computer-readable medium of claim 7, wherein the one or more test reports comprise a percentage of Java APIs that were tested.

12. The computer-readable medium of claim 7, wherein the one or more test reports comprise a listing of Java APIs that do not have a corresponding JUnit test.

13. A Java application programming interface (API) testing system comprising:
    a processor;
    a storage device coupled to the processor that stores instructions;
    wherein the instructions, when executed by the processor, cause the system to perform testing comprising:
        deriving one or more Java APIs to be tested from the software application;
        deriving Java Unit (JUnit) test methods used to test the Java APIs;
        mapping each Java API with a corresponding JUnit test method by using byte code introspection; and
        generating one or more test reports.

14. The testing system of claim 13, wherein the deriving one or more Java APIs to be tested comprises using Java Reflection.

15. The testing system of claim 13, wherein the deriving JUnit tests comprises searching for annotations.

16. The testing system of claim 15, wherein the annotations are derived from a JUnit test case.

17. The testing system of claim 13, wherein the one or more test reports comprise a percentage of Java APIs that were tested.

18. The testing system of claim 13, wherein the one or more test reports comprise a listing of Java APIs that do not have a corresponding JUnit test.

* * * * *